United States Patent
Chandrasekaran et al.

(10) Patent No.: US 11,976,200 B2
(45) Date of Patent: May 7, 2024

(54) PRODUCTS HAVING SHEETS OF 2D MATERIALS AND RELATED INKS FOR DIRECT INK WRITING

(71) Applicant: Lawrence Livermore National Security, LLC, Livermore, CA (US)

(72) Inventors: Swetha Chandrasekaran, Dublin, CA (US); Marcus A. Worsley, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 448 days.

(21) Appl. No.: 16/771,636

(22) PCT Filed: Jan. 18, 2019

(86) PCT No.: PCT/US2019/014157
§ 371 (c)(1),
(2) Date: Jun. 10, 2020

(87) PCT Pub. No.: WO2019/143912
PCT Pub. Date: Jul. 25, 2019

(65) Prior Publication Data
US 2020/0339827 A1  Oct. 29, 2020

Related U.S. Application Data

(60) Provisional application No. 62/619,664, filed on Jan. 19, 2018.

(51) Int. Cl.
*C09D 1/00* (2006.01)
*C01B 21/064* (2006.01)
(Continued)

(52) U.S. Cl.
CPC .............. *C09D 1/00* (2013.01); *C01B 21/064* (2013.01); *C01B 32/194* (2017.08);
(Continued)

(58) Field of Classification Search
CPC ..... C01G 39/06; C01B 32/198; C01B 32/194; C01B 21/064; C01B 2204/22;
(Continued)

(56) References Cited

U.S. PATENT DOCUMENTS

| 9,278,465 B1 | 3/2016 | Worsley et al. |
| 10,647,580 B2 | 5/2020 | Ye et al. |

(Continued)

FOREIGN PATENT DOCUMENTS

| CN | 106167654 A | 11/2016 |
| WO | 2017060719 A1 | 4/2017 |

OTHER PUBLICATIONS

Worsley et al., "Ultralow Density, Monolithic WS2, MoS2, and MoS2/Graphene Aerogels," ACS Nano, vol. 9, No. 5, 2015, pp. 4698-4705.

(Continued)

*Primary Examiner* — Vishal V Vasisth
(74) *Attorney, Agent, or Firm* — Zilka-Kotab, P.C.

(57) ABSTRACT

In one inventive concept, an ink includes a precursor of a graphene analogue, a thickener, and a solvent. In another inventive concept, an ink includes a graphene analogue, a thickener, and a solvent. In yet another inventive concept, an aerogel includes a three-dimensional printed structure having printed features comprised of two dimensional sheets of a graphene analogue.

29 Claims, 5 Drawing Sheets

(51) Int. Cl.
    *C01B 32/194*     (2017.01)
    *C01B 32/198*     (2017.01)
    *C01G 39/06*     (2006.01)
    *B33Y 10/00*     (2015.01)
    *B33Y 70/10*     (2020.01)

(52) U.S. Cl.
    CPC ............ *C01B 32/198* (2017.08); *C01G 39/06* (2013.01); *B33Y 10/00* (2014.12); *B33Y 70/10* (2020.01); *C01B 2204/02* (2013.01); *C01B 2204/04* (2013.01); *C01B 2204/22* (2013.01); *C01P 2004/20* (2013.01)

(58) Field of Classification Search
    CPC ............ C01B 2204/04; C01B 2204/02; C09D 11/037; C09D 1/00; C09D 11/322; B33Y 70/10; B33Y 10/00; C01P 2004/20
    See application file for complete search history.

(56) References Cited

U.S. PATENT DOCUMENTS

| | | |
|---|---|---|
| 2015/0024122 A1 | 1/2015 | Wu et al. |
| 2015/0337145 A1 | 11/2015 | Torrisi et al. |
| 2016/0067891 A1 | 3/2016 | Worsley et al. |
| 2016/0185990 A1* | 6/2016 | Cho ................ C09D 11/03 252/514 |
| 2016/0360616 A1 | 12/2016 | Zhamu et al. |
| 2017/0036915 A1 | 2/2017 | Worsley et al. |
| 2017/0267543 A1 | 9/2017 | Thevasahayam |
| 2018/0133794 A1 | 5/2018 | Jeong et al. |
| 2018/0196345 A1 | 7/2018 | Worsley et al. |
| 2018/0208467 A1 | 7/2018 | Ye et al. |

OTHER PUBLICATIONS

Rousseas et al., "Synthesis of Highly Crystalline sp2?Bonded Boron Nitride Aerogels," ACS Nano, vol. 7, No. 10, 2013, pp. 8540-8546.
Cheng et al., "Highly compressible 3D periodic graphene aerogel microlattices," Nature Communications, No. 6:6962, 2015, pp. 1-8.
Grotta et al., "3D Printing of 2D Atomically Thin," Cornell University, 2017, 14 pages, retrieved from Materialshttps://arxiv.org/vc/arxiv/papers/1710/1710.03956v1.pdf.
International Search Report and Written Opinion from PCT Application No. PCT/US2019/014157 dated May 24, 2019.
International Preliminary Examination Report from PCT Application No. PCT/US2019/014157, dated Jul. 30, 2020.
Ye et al., U.S. Appl. No. 15/417,134, filed Jan. 26, 2017.

* cited by examiner

PRODUCTS HAVING SHEETS OF 2D MATERIALS AND RELATED INKS FOR DIRECT INK WRITING

RELATED INKS FOR DIRECT INK WRITING

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to additive manufacturing, and more particularly, this invention relates to products having sheets of two-dimensional materials and related inks for direct ink writing.

BACKGROUND

Two-dimensional (2D), or layered materials (e.g., graphene and graphene analogues) are relevant to a broad range of research fields and industrial processes. Graphene is a 2D crystalline allotrope of carbon and has a number of remarkable properties, including extremely low electrical and thermal resistivity, large carrier mobility, high surface area, and exceptional mechanical elasticity and strength. Similar to graphene, hexagonal boron nitride (BN) is a 2D material that has highly desirable properties such as chemical inertness, high melting temperature, high thermal conductivity, and low density. Transition metal dichalcogenides (TMDs) are a class of layered material in which a single sheet consists of a layer of metal atoms (e.g., molybdenum (Mo), tungsten (W), vanadium (V), etc.) sandwiched between two layers of chalcogen atoms (e.g., sulfur (S), selenium (Se), tellurium (Te), etc.). Both graphene and graphene analogues, such as layered black phosphorous and TMDs (e.g., $MoS_2$, $WS_2$, $MoSe_2$, $TiSe_2$, etc.), have been widely researched by physicists, chemists, and materials scientists for applications that include catalysis, energy storage, lubricants, sensors, and electronics.

Contemplative approaches have shown fabrication of monolith structures of other 2D material-doped graphene aerogels. One method includes immersion of a pre-synthesized graphene aerogel in a desired other 2D material solution followed by freeze drying the pre-synthesized graphene aerogel with the other 2D material solution. However, these approaches are limited by the efficiency of dipping the graphene aerogel structure into the other 2D material solution. Also, having a homogeneous distribution of 2D material-graphene doped hybrid aerogels remains a challenge in the dipping method.

It would be desirable to create a more homogeneous structure by additive manufacturing to form three-dimensional structures with 2D materials, with or without graphene, in order to more efficiently combine the exceptional properties of all types of 2D materials in one structure for applications such as catalysis, energy storage, sensors, and electronics.

SUMMARY

In one inventive concept, an ink includes a precursor of a graphene analogue, a thickener, and a solvent.

In another inventive concept, an ink includes a graphene analogue, a thickener, and a solvent.

In yet another inventive concept, an aerogel includes a three-dimensional printed structure having printed features comprised of two dimensional sheets of a graphene analogue.

Other aspects and advantages of the present invention will become apparent from the following detailed description, which, when taken in conjunction with the drawings, illustrate by way of example the principles of the invention.

DETAILED DESCRIPTION

Figure 1:
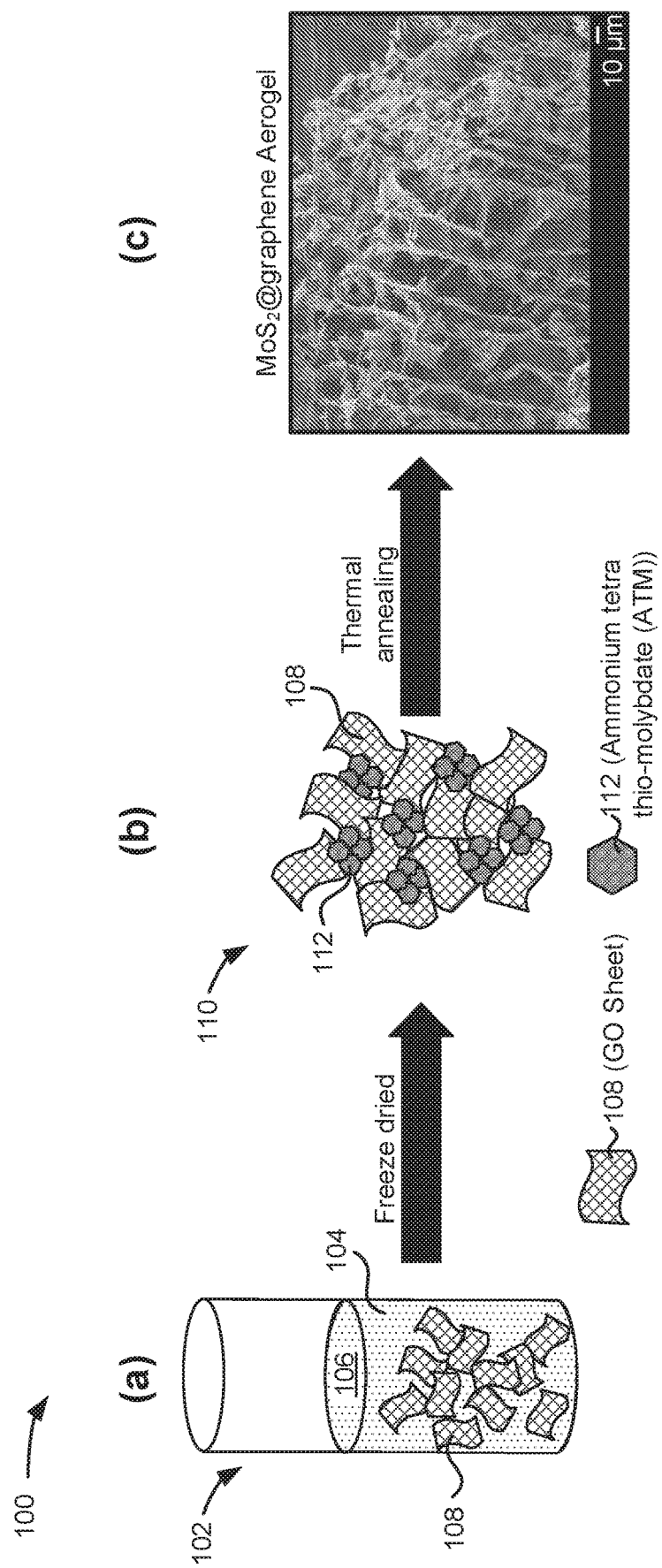
FIG. 1 is a schematic representation of method of forming an aerogel comprising a composition of graphene analogue doped with graphene, according to one inventive concept.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an inEerval of accuracy that ensures the technical effect of the feature in question. En various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

The present disclosure includes several descriptions of exemplary "inks" used in an additive manufacturing process to form the inventive optics described herein. It should be understood that "inks" (and singular forms thereof) may be used interchangeably and refer to a composition of matter comprising a plurality of particles coated with/dispersed throughout a liquid phase such that the composition of matter may be "written," extruded, printed, or otherwise deposited to form a layer that substantially retains its as-deposited geometry and shape without excessive sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

The following description discloses several three-dimensional structures formed via direct ink writing (DIW), extrusion freeform fabrication, or other equivalent techniques and therefore exhibit unique structural and compositional characteristics conveyed via the precise control allowed by such techniques.

The following description discloses several preferred inventive concepts of inks of two dimensional material for direct ink writing and/or related systems and methods.

In one general inventive concept, an ink includes a precursor of a graphene analogue, a thickener, and a solvent.

In another general inventive concept, an ink includes a graphene analogue, a thickener, and a solvent.

In yet another general inventive concept, an aerogel includes a three-dimensional printed structure having printed features comprised of two dimensional sheets of a graphene analogue.

A list of acronyms used in the description is provided below.
2D Two dimensional
3D Three-dimensional
ATM ammonium tetra thio-molybdate
ATT ammonium tetra thio-tungstate
BN Boron nitride
C Celsius
DIW Direct ink writing
g grams
GO Graphene oxide
h hours
μm micron
mg milligram
Mo Molybdenum
nm nanometer
psi pound force per square inch
PTFE polytetrafluoroethylene
S Sulfur
Se Selenium
SEM scanning electron micrograph
Te Tellurium
TMD Transition metal dichalcogenide
W Tungsten
wt % weight percent Various inventive concepts described herein show the capability to formulate inks for direct ink writing where the ink formulation includes multiple 2D materials (e.g., graphene and/or graphene analogues) and viscosity modifiers, thickeners, and/or fillers which may be removed during post-processing steps. Various inventive concepts described herein present a process of fabricating 2D material based aerogels through a direct ink writing (DIW) technique.

Various inventive concepts described herein focus on formulating graphene and graphene analogue aerogels by forming an ink comprising graphene oxide (GO) sheets and graphene analogues as a co-gel before extrusion through a nozzle during DIW to form a printed 3D structures. In some approaches, the printed 3D structures have channels in one direction. A porous solid ligament of graphene and/or graphene analogues may be formed having high electrical conductivity.

In one inventive concept, an ink includes a precursor of a graphene analogue, a thickener, and a solvent. A graphene analogue is defined as a material having a comparable structure to the two dimensional (2D) structure of graphene, for example, having a layered structure where each layer is an atom or a few atoms thick.

In some approaches, a precursor of the graphene analogue includes a precursor of a transition metal dichalcogenide. Transition metal dichalcogenides (TMD), e.g., TMD monolayers, $MX_2$, etc. are atomically thin material structures having one layer of transition metal (M) atoms, such as Mo or W, sandwiched between two layers of chalcogen (X) atoms, such as, S, Se, or Te. Precursors of TMDs may be ammonium salts that can be transformed into TMDs during a thermal annealing step that includes heating in a tube furnace under inert gas (e.g., $Ar/H_2$ gas) in the presence of sulfur powder. For example, in some approaches, a precursor of a transition metal dichalcogenide includes ammonium tetra thio-molybdate (ATM), ammonium thio-tungstate (ATT), etc.

In some approaches, the precursor of the graphene analogue in the ink may include graphene oxide (GO). As a precursor to graphene, graphene oxide is an oxidized compound of carbon, oxygen, and hydrogen that retains an irregular layered structure, and further may be referred to as graphene oxide sheets. Graphene oxide sheets, as a precursor to graphene, can be reduced to graphene by a thermal annealing step that includes heating in a nitrogen atmosphere.

In preferred approaches, the graphene oxide (GO) may include single layer sheets having an average lateral dimension in a range of about 200 nanometers (nm) to about 800 nm. In one approach, a GO-based ink may include a suspension of single layer GO sheets having an average lateral dimension in a range of about 300 nm to about 800 nm in aqueous solution. In some approaches, a GO-based ink may be used printing structures using DIW.

In some approaches, the precursor of the graphene analogue may be a composition of a graphene oxide and a precursor of a transition metal dichalcogenide (TMD). In some approaches, the ink may be a co-gel ink that includes a suspension of precursors of transition metal dichalcogenides (TMDs). For example, precursors for TMDs may include ammonium tetra thio-molybdate (ATM), ammonium tetra thio-tungstate (ATT), etc. The TMD precursors may be suspended in an aqueous solution at a concentration in a range of about 1 wt % to about 10 wt %. In an exemplary approach, the concentration of precursors of about 2.6 wt % of total ink. A co-gel suspension may be formed by adding GO in the suspension of precursors of TMDs at a final concentration in a range of about 1 wt % to about 4 wt % of total ink. In some approaches, GO may be obtained commercially and added to the TMD precursor suspension. In exemplary approaches, the co-gel suspension of GO and TMD precursor may be ultra-sonicated until homogenous, the duration of sonication may vary for different sources of GO. In an exemplary approach, the co-gel suspension of an ink may include GO and TMD precursor at 4.0 wt % and 2.6 wt %, respectively.

In some approaches, an ink includes a second graphene analogue. In some approaches, the second graphene analogue in the ink may be preferably different than the resulting graphene analogue formed by the precursor. In other approaches, the second graphene analogue in the ink is similar to the resulting graphene analogue formed by the precursor.

In one approach, the second graphene analogue is graphene. In other approaches, the second graphene analogue may include boron nitride (BN), transition metal dichalcogenides (e.g., layered dichalcogenides) such as $MoS_2$, $WS_2$, $WS_2$, $MoSe_2$, $TiSe_2$, etc.

In some approaches, the precursor of the graphene analogue may be a composition of graphene oxide and a second graphene analogue. In one approach, the ink may be a co-gel of graphene oxide and a different graphene analogue, for example the second graphene analogue is mixed in suspension with GO sheets before printing a three-dimensional structure using with GO-based ink. In various approaches, other 2D material (e.g., graphene analogue) may refer to 2D material other than GO sheets, for example, TMDs such as $MoS_2$, $WS_2$, BN, etc. In some approaches, the ink contains a thickener in addition to GO, but not so much as to cause an unacceptable viscosity increase during the 3-D printing. In some approaches, the thickening agent may be a surfactant, a cellulose derivative, a carbon black material, etc.

In some approaches, the ink is a suspension an may be mixed by ultrasonication. In preferred approaches, the concentration of the precursor of the graphene and/or precursor of the graphene analogue in the ink may be in a range of about 1 wt % to about 10 wt % of total ink. In some approaches, the concentration of precursor of the graphene analogue may be about 1 wt % to about 60 wt % of total ink. In one exemplary approach, the GO concentration in the ink may be about 4.0 wt % (approximately 40 mg/ml) of total ink.

In some approaches, the thickener in the ink may be soluble in water and have a suitable molecular weight such that dissolving it in water raises the viscosity of the water solution. In some approaches, the thickener may be a thixotropic agent. In some approaches, the thickening agent may be a surfactant, a cellulose derivative, a carbon black material, a combination thereof, etc.

In exemplary approaches, the thickener comprises a soluble cellulose derivative or a soluble polyoxyalkylene compound. In some approaches, the thickener is hydroxypropyl methylcellulose that may be mixed with the ink suspension at concentration in a range of about 1 wt % to about 5 wt % of total ink. In preferred approaches, a concentration of about 3 wt % of hydroxypropyl methylcellulose is mixed in the ink suspension.

In some approaches, the thickener may be carbon black particles that may be mixed ink the suspension graphene and/or graphene analogue of the ink at concentration in a range of about 5 wt % to about 20 wt % of total ink. In preferred approaches, a concentration of about 5 wt % of carbon black particles is mixed with. In some approaches, a gelling agent may be added to the GO suspension with carbon black particles. For example, but not limited to, a gelling agent may be an ammonium carbonate solution.

In one inventive concept, an ink includes a graphene analogue, a thickener, and a solvent. In one approach, a graphene analogue includes graphene. In some approaches, a graphene analogue includes boron nitride (BN), transition metal dichalcogenides (e.g., layered dichalcogenides) such as $MoS_2$, $WS_2$, $WS_2$, $MoSe_2$, $TiSe_2$, etc.

In preferred approaches, a combination of thickeners may be added to the co-gel suspension of ink. In some approaches, the mixture of may include a soluble cellulose derivative or a soluble polyoxyalkylene compound, a carbon black material, etc. For example, the mixture may include hydroxypropyl methylcellulose, in a range of about 1 wt % to about 2 wt %, and about 5 wt % carbon black particles. The combination mixture of thickeners may be added to the co-gel suspension to form a 2D material@GO ink (e.g. TMD precursor@GO ink, TMD@GO, GO, TMD, BN@GO, BN, etc.).

In preferred inventive concepts, the precursor TMD precursor@GO inks may be extruded through a nozzle for DIW and processed after printing (e.g., drying and thermal annealing) to yield TMD@graphene aerogel, for example, $MoS_2$@graphene aerogel, $WS_2$@graphene aerogel, BN@graphene aerogel, etc.

FIG. 1 shows a method 100 for forming a graphene analogue@graphene aerogel, in accordance with one inventive concept. As an option, the present method 100 may be implemented to structures such as those shown in the other FIGS. described herein. Of course, however, this method 100 and others presented herein may be used to form structures for a wide variety of devices and/or purposes which may or may not be related to the illustrative inventive concepts listed herein. Further, the methods presented herein may be carried out in any desired environment. Moreover, more or less operations than those shown in FIG. 1 may be included in method 100, according to various inventive concepts. It should also be noted that any of the aforementioned features may be used in any of the inventive concepts described in accordance with the various methods.

FIG. 1 depicts schematic representation of a method 100 to form a graphene analogue@graphene aerogel formed from an ink characterized by a co-gel of a composition of a precursor of graphene analogue and graphene oxide (GO). As shown in part (a) of FIG. 1, an ink 102 may be combined including a precursor of a graphene analogue 104, e.g., a precursor of transition metal dichalcogenide (TMD) such as ATM, suspended in a solvent 106 (e.g., and aqueous solution) with GO sheets 108. A thickener may be added for using the ink 102 to print a three-dimensional structure.

Part (b) of FIG. 1 depicts the formation of an aerogel 110 following a freeze dried process of the ink composition that includes the precursor of the graphene analogue 112, e.g., ATM particles, crystals, etc. as shown in part (b) interspersed with GO sheets 108. In some approaches, the aerogel 110 is a freeze-dried printed three-dimensional structure (e.g., DIW printed structure using the ink of part (a) of the composition of the GO sheets 108 in a suspension of the precursor of the graphene analogue ATM 104 with added thickeners for DIW printing).

Part (c) of FIG. 1 is a scanning electron micrograph image of the ATT@GO aerogel 110 of part (b) following a thermal annealing process that yields a $MoS_2$@Graphene aerogel (as shown in the image).

In other approaches with appropriate precursors of TMD, other graphene analogue@graphene aerogel inks may also be prepared (e.g., ammonium tetra thio-tungstate would result in an ATT@GO ink that after processing would yield $WS_2$@graphene aerogel).

In one inventive concept, an ink of a composition of graphene analogue@GO (e.g. $MoS_2$@GO, $WS_2$@GO, BN@GO, etc.) may be prepared directly from a mixture of graphene analogues (e.g., 2D nanosheets) and GO, in suspension. For example, for the preparation of monolith $WS_2$@GO or BN@GO aerogels, $WS_2$ or BN micropowder may be added to an aqueous suspension of GO, followed by methods of sonication (e.g. probe sonication, ultrasonication, etc.) to disperse the 2D nanosheets. A thickening agent, for example cellulose or carbon black particles, may be added for an appropriate final viscosity of the obtained suspension to form thixotropic inks. In some approaches, the thickening agent may be a surfactant, a cellulose derivative, a carbon black material, etc.

In one inventive concept, inks comprising a graphene analogue without the addition of GO may be prepared. In some approaches, an aqueous suspension of a precursor of TMD, e.g., ATM, ATT, etc., may be combined with thickeners, such as hydroxypropyl methylcellulose and carbon black particles, to form a thixotropic ink. In some approaches, the thickening agent may be a surfactant, a cellulose derivative, a carbon black material, etc. In preferred approaches, a greater amount of cellulose may be added to provide thickening of the ink in the absence of GO sheets. According to one inventive concept, a $MoS_2$ aerogel may be obtained following a thermal annealing process.

Figure 2:
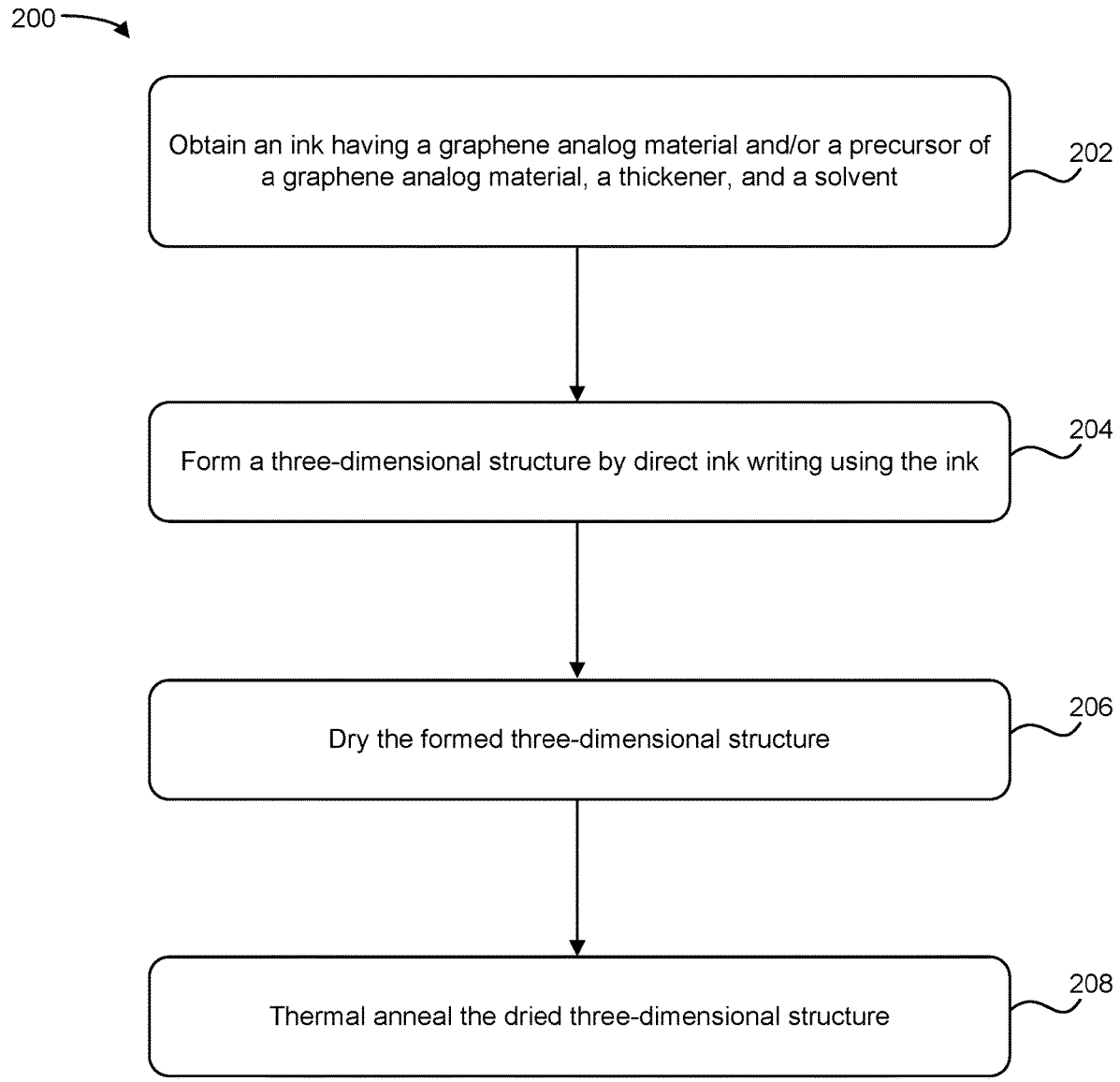
FIG. 2 is a flow chart of a method, according to one inventive concept.

FIG. 2 shows a method 200 for forming a graphene analogue aerogel, in accordance with one embodiment. As an option, the present method 200 may be implemented to form structures such as those shown in the other FIGS. described herein. Of course, however, this method 200 and others presented herein may be used to form structures which may or may not be related to the illustrative embodiments listed herein. Further, the methods presented herein may be carried out in any desired environment. Moreover, more or less operations than those shown in FIG. 2 may be included in method 200, according to various embodiments. It should also be noted that any of the aforementioned features may be used in any of the embodiments described in accordance with the various methods.

Step 202 of method 200 begins with obtaining an ink having a graphene analogue and/or a precursor of a graphene analogue, a thickener, and a solvent, as described herein. In some approaches the ink may include a gelling agent, typically in inks that include a carbon black material.

Step 204 includes forming a three-dimensional (3D) structure by direct ink writing (DIW) using the ink. In various approaches, the DIW process includes loading the described ink in a micro nozzle to pattern 3D structures on a substrate (as described in the Experiments section in more detail below). Illustrative methods of direct ink writing with graphene-based inks use methodology disclosed in U.S. patent application Ser. No. 14/481,362, which is herein incorporated by reference. In some approaches, simple cubic lattices with multiple orthogonal layers of parallel cylindrical rods may be printed in alternate.

The average diameter of the ligaments of the printed structure may be about equal to the diameter of the nozzle used in DIW techniques. In some approaches, the average diameter of the ligaments (e.g., cylindrical rods) may be about 600 μm substantially similar to the diameter of 600 μm nozzle with center-to-center rod spacing may be up to 1.2 mm. In other approaches, average diameter of the ligaments may be about 250 μm substantially similar to the diameter of 250 μm nozzle with center-to-center rod spacing may be up to 0.8 mm. In some approaches, the average diameter of the ligaments may be greater than 1 mm if a nozzle having a diameter up to 1 mm is used for DIW. In preferred approaches, the nozzle may have a diameter greater than 250 μm to allow flowability (e.g., prevent clogging of the nozzle) of the inks that include the two dimensional sheets of graphene analogues and/or precursors of graphene and/or graphene analogues.

In some approaches, stack of about 10 layers may be formed for a structure where each layer may have a z spacing of approximately 0.3 mm.

In some approaches, before drying the formed 3D structure, an optional step may be included of heating the 3D structure for gelation of the 3D structure, followed by exchanging the solvent for optimal drying of the three-dimensional structure, for example, to remove substantially all the water from the structure prior to supercritical drying with carbon dioxide which is not miscible with water.

Step 206 of method 200 includes drying the formed three-dimensional structure. In some approaches, as shown in FIG. 1, an ink includes an aqueous suspension of precursor of graphene analogue, e.g., ATM, and GO sheets, and a thickener. Using the ink, a 3D structure is printed by DIW and freeze dried to form an ATM@GO aerogel. Conventional freeze-dried methods may be used. In exemplary approaches, the 3D structure may be freeze dried by immersing the 3D structure in liquid nitrogen followed by freeze drying under vacuum.

In some approaches where the ink includes a non-aqueous solvent, the resulting printed 3D structure may be dried by a method of supercritical drying. In preferred approaches, the 3D structure may be super-critically dried with liquid $CO_2$ at a critical temperature (e.g. 55° C.) at under pressure of in a range of about 1200 to about 1400 psi.

Step 208 of method 200 includes thermal annealing the dried three-dimensional structure. The thermal annealing may include at least two heating steps. A first heat treatment at a first temperature of a dried aerogel comprising precursor of graphene analogue with or without graphene oxide transforms the aerogel into a pure graphene analogue aerogel structure.

The first heat treatment of the thermal annealing process for transforming graphene oxide aerogel structure to graphene may include heating at temperatures in a range of greater than 600° C. and less than 3000° C. in a nitrogen atmosphere, with a heating and cooling rate of about 2° C./minute, but may be faster or slower. In preferred approaches, the thermal annealing of graphene oxide includes heating the graphene oxide aerogel structure to a temperature of about 1050° C. for about 3 hours.

The first heat treatment of the thermal annealing process for transforming precursor of TMD aerogels to TMD aerogels include heating the precursor aerogel in a tube furnace at a temperature in a range of about 400° C. to about 600° C. in an inert atmosphere (e.g., $Ar/H_2$ gas) in the presence of sulfur (S) powder for a duration of time of about 3 hours to 5 hours, and preferably 4 hours. In preferred approaches, the thermal annealing includes heating at a first temperature of about 500° C. in an $Ar/H_2$ gas atmosphere in the presence of sulfur powder.

In some approaches, a second heat treatment at a second temperature may burn off materials of the ink used to print the aerogel structure and to further anneal the graphene analogue aerogel, thereby leaving a 3D structure of a pure graphene analogue aerogel substantially free of contaminants. In some approaches, the second heating includes increasing the temperature to a range of about 700° C. to about 1100° C. for a shorter duration of time, e.g., about one hour at a rate of about 10° C./minute. In preferred approaches, the second heating includes increasing the temperature to about 750° C.

In some approaches, the thermal treatment may include a heat treatment process of heating a freeze-dried 2D material@GO structure under an inert gas with sulfur powder at a first temperature, e.g. 500° C. and held for 4 hours, followed by a heating at a second temperature, e.g. 750° C. and held again for one hour at a heating rate of 10° C./min. In various inventive concepts, the thermal annealing of step 208 may result in a TMD@graphene aerogel. For example, $MoS_2$@graphene, $WS_2$@ graphene, etc.

Figure 3:
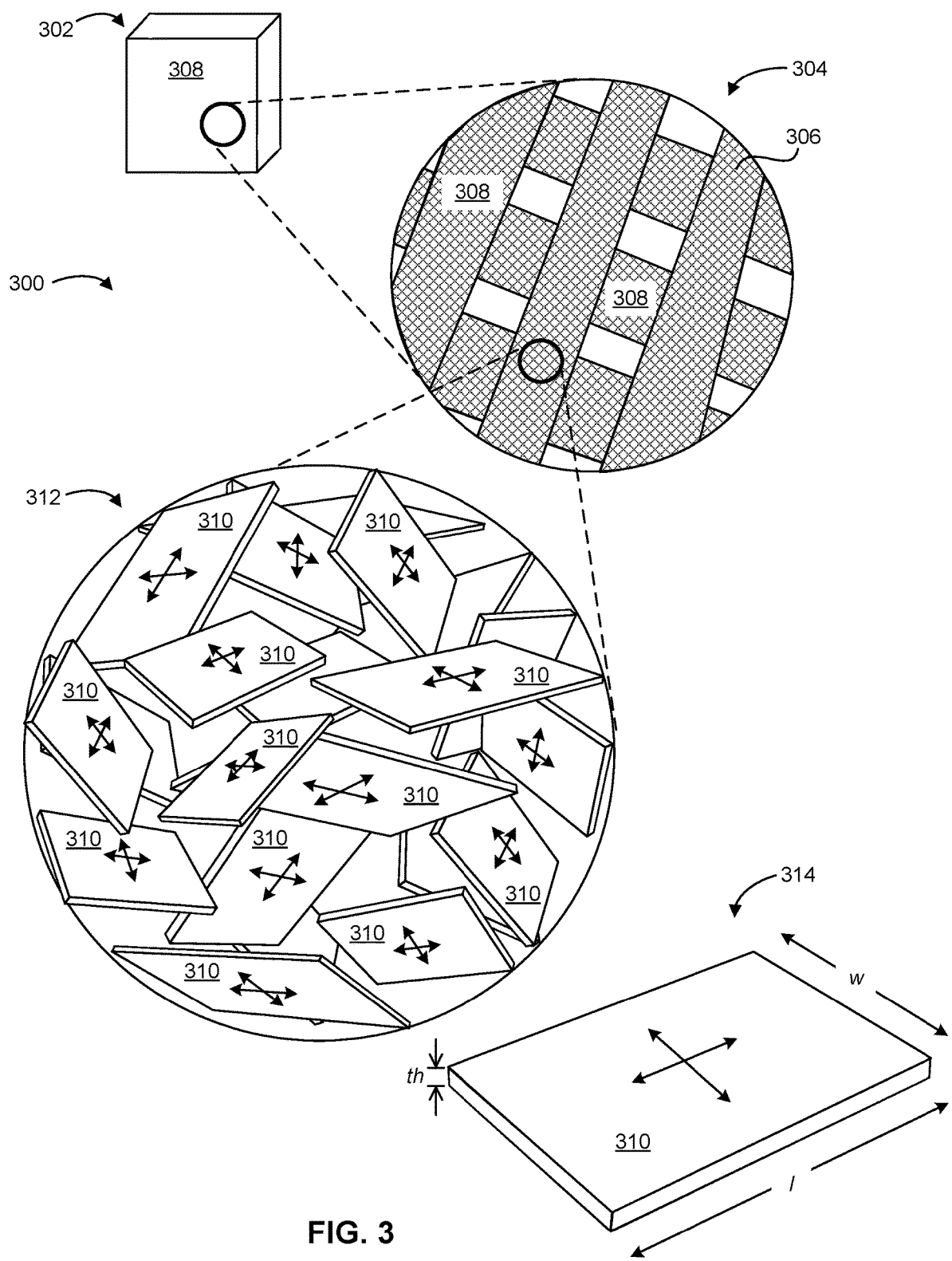
FIG. 3 is a schematic drawing of an aerogel comprising a graphene analogue, according to one inventive concept.

FIG. 3 depicts a structure 300 of a graphene analogue aerogel, in accordance with one inventive concept. As an option, the present a structure 300 may be implemented in conjunction with features from any other embodiment listed herein, such as those described with reference to the other FIGS. Of course, however, such structure 300 and others presented herein may be used in various applications and/or in permutations which may or may not be specifically described in the illustrative embodiments listed herein. Further, the structure 300 presented herein may be used in any desired environment.

As shown in FIG. 3, a structure 300 may be an aerogel 302 having a graphene analogue material 308. A magnified view 304 of the material 308 of the aerogel 302 shows a porous solid ligaments 306. In some instances, the ligaments 306 may be described as multiple orthogonal layers of parallel rods, as printed in alternate by DIW processes.

Further, a magnified view 312 of the ligaments 306 of the material 308 show a three-dimensional printed structure 300 having printed features formed of two dimensional sheets 310 of the graphene analogue material 308. In some approaches, the aerogel 302 includes sheets 310 each have two perpendicular dimensions.

As shown in the magnified view 314 of a single sheet 310, an average of each dimension l, w may be at least 50 nm. In some approaches, an average thickness th of the sheets 310 may be less than about 5 nm. In some approaches, an average thickness th of the sheets 310 may be preferably less than about 2 nm. In some approaches, an average thickness th of the sheets 310 may be ideally less than about 1 nm.

The drawings in FIG. 3 are not to scale, but are presented to show the likely differences from the conventional internal structures of an aerogel formed without 2D material (e.g., graphene analogues).

In various inventive concepts described herein, an aerogel includes graphene. In one approach, an aerogel includes TMD. In one approach, an aerogel includes a TMD and graphene, e.g., an TMD@graphene aerogel may be formed. The components of the TMD@ graphene aerogel may include carbon, oxygen, sulfur, and transition metal with substantially zero contaminants, e.g., components not found in TMD material.

In one inventive concept, the aerogel includes boron nitride. In one approach, the aerogel includes boron nitride and graphene, e.g., a BN@graphene aerogel may be formed. In yet another approach, an aerogel includes boron nitride and a TMD, e.g., a TMD@BN aerogel may be formed.

Physical properties of a $MoS_2$@graphene aerogel and a $MoS_2$ aerogel formed by methods described herein may have comparable density and electrical conductivity, according to various inventive concepts. In one approach, a graphene analogue aerogel is electrically conductive. In one approach a graphene analogue aerogel has a surface area greater than 50 meter squared per gram.

In various approaches, a graphene analogue aerogel has substantially zero contaminants, e.g., components not found in the graphene analogue material used in the ink to form the structure.

Experiments

Preparation of Inks

Graphene Oxide Particle Free Ink

Single layer graphene oxide (GO) sheets having a lateral dimension of 300-800 nm were used to prepare the aerogels. The GO suspension was prepared by ultra-sonicating 0.8 g of GO in 20 g of water for 24 h. This combination yielded a GO concentration of 40 mg/ml. The suspension was then mixed with 5 wt % of hydroxypropyl methylcellulose (GO-ink-I) or with 20 wt % of carbon black particles (GO-ink-II) in a planetary Thinky mixer (Laguna Hills, CA) at 2000 rpm for 5 minutes. In the case of GO-ink-II, a pre-defined amount of ammonium carbonate solution (gelling agent) was added to the ink suspension before printing. The GO-based inks were extruded though a nozzle for DIW printing a 3D structure. After printing the 3D structures of GO-based inks were processed to yield graphene aerogels.

Inks of Precursor of Graphene Analogues

A suspension of ammonium tetra thio-molybdate (ATM) was prepared by mixing 0.26 g of ATM in 10 g of water. To this suspension, 0.8 g of GO was added and the suspension was ultra-sonicated for 24 h. This combination yielded a GO and ATM concentration of 40 and 26 mg/ml, respectively.

A mixture of thickeners was added to the co-gel of ATM and GO sheets (ATM@GO). Approximately, 1-2 wt % of hydroxypropyl methylcellulose and 5 wt % of carbon black particles were added to the suspension using a planetary Thinky mixer at 2000 rpm for 5 minutes. The co-gel of ATM@GO ink was extruded through a nozzle for DIW printing a 3D structure. After printing the 3D structures of ATM@GO-based inks were processed to yield $MoS_2$@graphene aerogels.

In a similar fashion, composite graphene analogue@GO (e.g. $WS_2$@GO or BN@GO, etc.) inks were prepared directly from a mixture of 2D nanosheets and GO, in suspension. For the preparation of monolith $WS_2$@GO or BN@GO aerogels, 0.4 g of $WS_2$ or BN micropowder, respectively, was added to 20 g of 20 mg/ml GO suspension and the mixture is subjected to probe sonication to disperse the 2D nanosheets of the graphene analogues. It may be important to note that care was taken to avoid heating of the suspension during probe sonication as it will lead to evaporation of solvent (e.g., water). Based on the final viscosity of the obtained suspension, either cellulose or carbon black particles was added to form thixotropic inks.

Neat graphene analogue inks can also be prepared without the addition of GO by mixing them in water and by adding required amounts of hydroxypropyl methylcellulose and carbon black particles to form a thixotropic ink. For example, ATM inks (precursor for $MoS_2$ aerogel) can be prepared by mixing 0.26 g of ATM in 10 g of water and sonicating overnight to form a homogenous suspension. To this suspension 3-4 wt % of hydroxypropyl methylcellulose was added and again sonicated in an ultrasonication bath for 24 h. A pre-defined amount of carbon black particles was added to the ATM/cellulose mixture to impart stiffness to ink. Finally, $MoS_2$ aerogel was obtained by following a thermal annealing process.

Direct Ink Writing of the Inks

The ink was loaded into a syringe barrel and centrifuged for a minute at 4000 rpm to remove air bubbles. The ink was then extruded through a micro nozzle (600 μm diameter or less) to pattern 3D structures on a glass substrate. The print parameters were adjusted for optimal printing. For example, pressure applied to extrude the ink was varied between 15-20 psi based on the viscosity of the ink and the writing speed was kept at 3 mm/sec for all the 3D printed structures. A new PTFE nozzle tip was used for each print, for the fabrication of electrodes. However, each printing during fabrication of electrodes may use the prior-used tip.

Simple cubic lattices with multiple orthogonal layers of parallel cylindrical rods were printed alternately. The diameter of the cylindrical rods equaled the diameter of nozzle and the center-to-center rod spacing of 1.2 mm (for 600 μm nozzle) and 0.8 mm (250 μm nozzle) were respectively used. A total of 10 layers were stacked on the structure such that each layer has a z spacing of 0.3 mm. In order to avoid cracking due to evaporation of water, drops of isooctane (2,2,4-trimethyl-pentane) were added onto the printed structure frequently. The printed parts on the glass substrate were post-processed as described.

For GO-ink-I, the 3D printed structures were immersed in liquid nitrogen and freeze dried for 24 h in vacuum to form aerogels. Next, the aerogels were subjected to a heat treatment process where the samples were heated in a tube furnace under nitrogen atmosphere at 1050° C. for 3 h with a heating and cooling rate of 2° C./min to form graphene aerogels.

For GO-ink-II, the printed parts were carefully placed in a container with isooctane, sealed tightly to avoid evaporation of the solvent, and were placed in the oven at 80° C. for Table 1 lists physical properties from 3D structures formed from $MoS_2$@GO ink and formed from $MoS_2$ ink (without graphene). The density of the bulk monolith and printed structures formed from the $MoS_2$@GO ink tends to be greater than the density of the bulk monolith and printed structure of the $MoS_2$ ink (without graphene). Moreover, the conductivities of the bulk monolith formed by each ink were comparable.

TABLE 1

Physical properties of 3D structures formed from graphene analogue inks

| | Density of bulk monolith | Density of print | Surface area | Conductivity of bulk monolith |
|---|---|---|---|---|
| $MoS_2$@GO Ink | 0.143 g/cm$^3$ ± 0.012 | 0.123 g/cm$^3$ ± 0.024 | 67 m$^2$/g | 0.34 S/cm |
| $MoS_2$ Ink | 0.119 g/cm$^3$ ± 0.013 | 0.11 g/cm$^3$ ± 0.031 | — | 0.53/cm |

72 h for gelation. Once gelled, solvent (e.g. water) was exchanged for acetone over 3 days. The solvent was exchanged every 24 h until the solvent of the gelled printed part was substantially acetone. Next, the gelled printed part was super critically dried with liquid $CO_2$. The samples are then super critically dried in liquid $CO_2$ at a critical temperature of 55° C. and at a pressure range of 1200-1400 psi. The aerogels were then subjected to a heat treatment process where the samples were heated in a tube furnace under nitrogen atmosphere at 1050° C. for 3 h with a heating and cooling rate of 2° C./min to form graphene aerogels.

For the ATM@GO, after freeze drying the printed ATM/GO aerogels similar to the manner used for GO-ink-I, the aerogels were heated in a tube furnace under Ar/H$_2$ gas in the presence of sulphur powder. The sample was heated in a two-step heating profile, to 500° C. and held for 4 h then further heated to 750° C. and held again for 1 h at a heating rate of 10° C./min.

For WS$_2$@GO ink, freeze-drying similar to the manner as used for GO-ink-I yielded a WS$_2$@GO aerogel. For a WS$_2$@graphene aerogel, the printed structures were heated in a tube furnace under Ar/H$_2$ gas in the presence of sulphur powder. The sample was heated in a two-step heating profile, to 500° C. and held for 4 h then further heated to 750° C. and held again for 1 h at a heating rate of 10° C./min.

For BN@GO ink, freeze-drying similar to the manner used for GO-ink-I yielded a BN@GO aerogel. For a BN@graphene aerogel, a thermal anneal of the printed structure similar to that used for GO-ink-I may be used.

For neat 2D material ink, e.g. ATM, the 3D printed structures were immersed in liquid nitrogen and freeze dried for 24 h in vacuum to form aerogels. The aerogels were then subjected to a heat treatment process where the samples were heated in a tube furnace in a two step temperature profile. The sample was heated to 500° C. and held for 4 h then further heated to 750° C. and held again for 1 h at a heating rate of 10° C./min.

Analysis Aerogel Structures Formed from Graphene Analogue Inks

Figure 4:
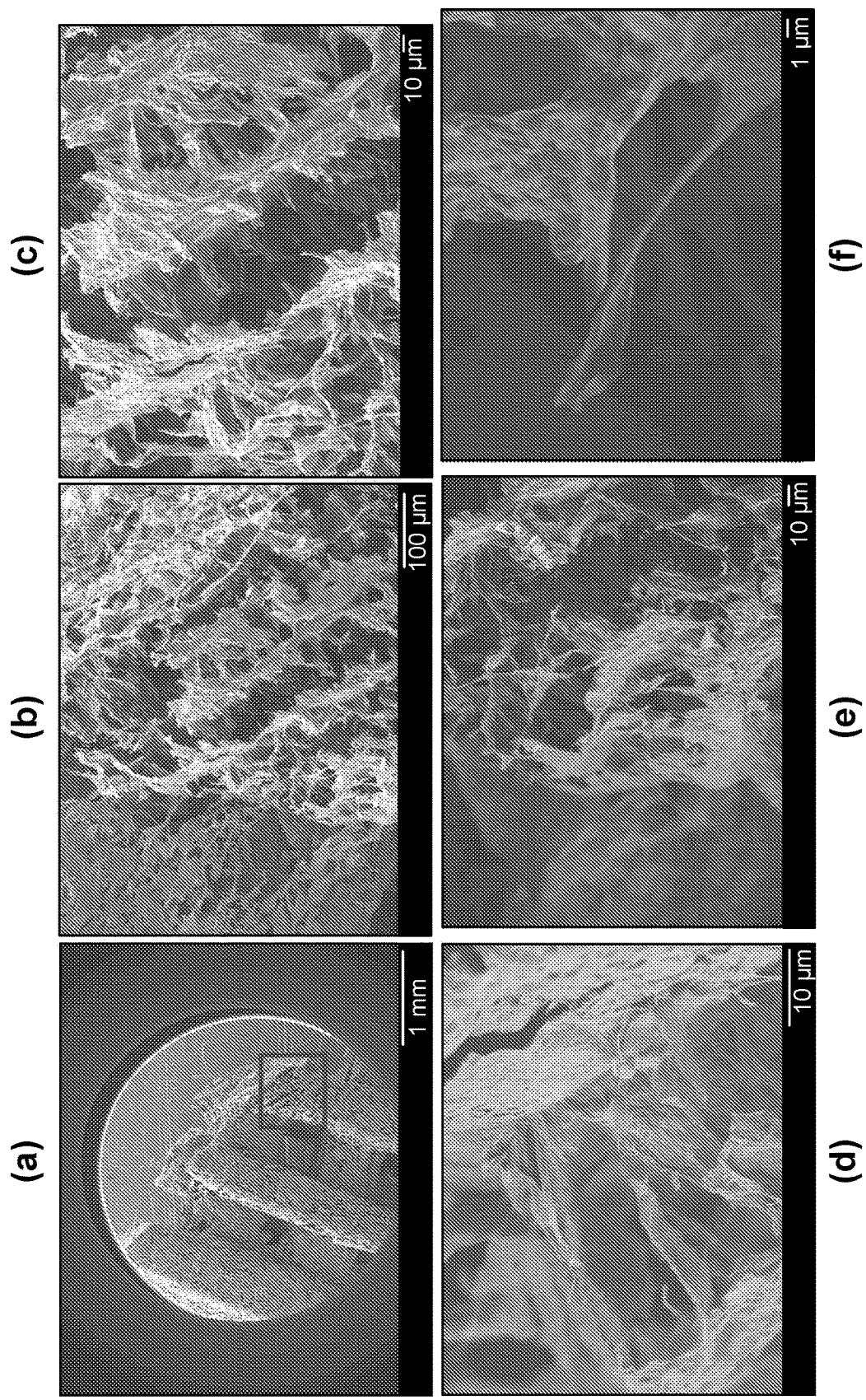
FIG. 4 parts (a) through (f) are scanning electron micrograph images of a 3D structure formed by direct ink writing with an ink, according to one inventive concept.

FIG. 4 parts (a) to (I) show scanning electron micrograph (SEM) of 3D structure printed by DIW using $MoS_2$@GO inks at various magnifications.

Figures 5A, 5B, 5C:
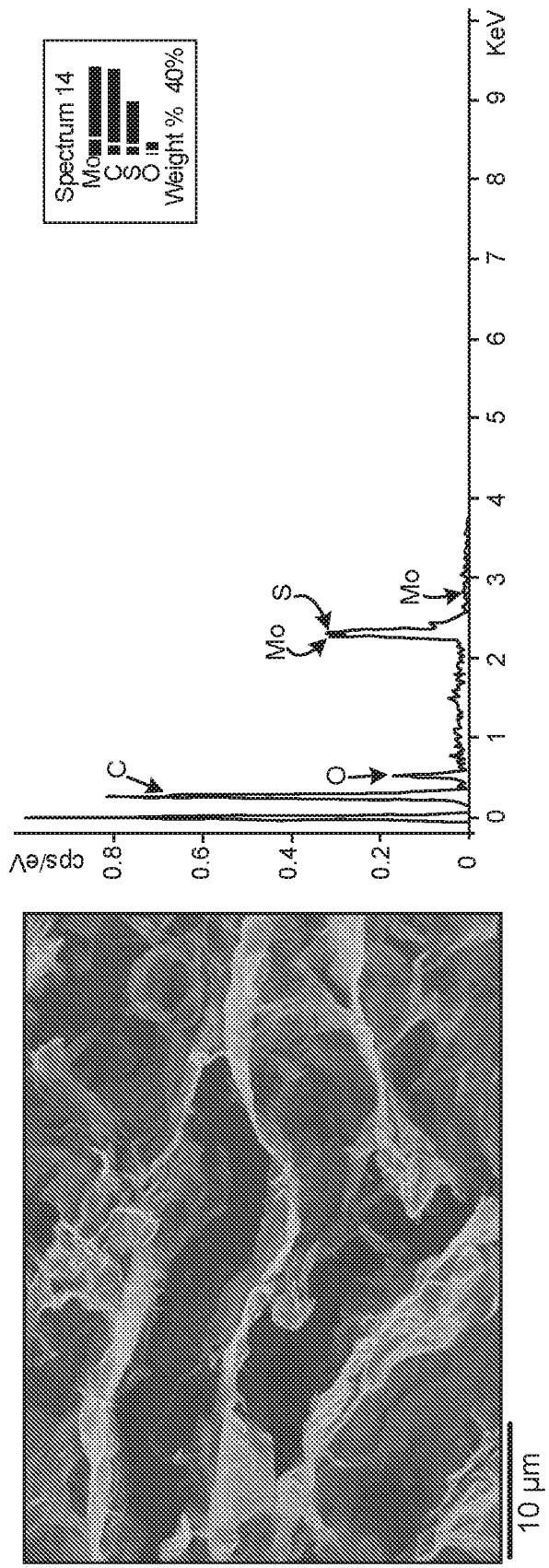
FIG. 5A is a scanning electron micrograph image of a 3D structure formed by direct ink writing with an ink, according to one inventive concept.
FIGS. 5B and 5C represent relative amounts of elements comprising the 3D structure, according to one inventive concept.

FIG. 5A is a SEM image of a 3D structure printed by DIW using $MoS_2$@GO ink. FIG. 5B is a plot of the proportion of elements in the final aerogel structure as shown and FIG. 5C shows the wt % of each element as derived from FIG. 5B.

Physical Properties of 3D Structures Formed from Graphene Analogue Inks

In Use

Various inventive concepts described herein may be used to optimize and design the lightweight aerogels such as graphene or other graphene analogues for device fabrication. Other applications of the inventive concept described herein may include catalysis, filtration/separations, capacitive deionization, capacitors, batteries, and energy conversion devices (e.g. hydrogen evolution). The 3D printed graphene aerogels may also be used a scaffold to coat with other materials for electrode application or to make supercapacitor devices.

The inventive concepts disclosed herein have been presented by way of example to illustrate the myriad features thereof in a plurality of illustrative scenarios, inventive concepts, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various inventive concepts have been described above, it should be understood that they have been presented by way of example only, and not limitation. Thus, the breadth and scope of an inventive concept of the present invention should not be limited by any of the above-described exemplary embodiments, but should be defined only in accordance with the following claims and their equivalents.

What is claimed is:

1. An ink, comprising:
   a precursor of a graphene analogue, wherein the precursor includes a graphene oxide in the form of single layer sheets;
   a thickener;
   a gelling agent; and
   a solvent.

2. An ink as recited in claim 1, wherein the precursor of the graphene analogue includes a precursor of a transition metal dichalcogenide.

3. An ink as recited in claim 1, wherein the precursor of the graphene analogue includes graphene oxide.

4. An ink as recited in claim 3, wherein the—single layer sheets have an average lateral dimension in a range of about 200 nm to about 800 nm.

5. An ink as recited in claim 1, comprising a second graphene analogue.

6. An ink as recited in claim 5, wherein the graphene analogue includes a transition metal dichalcogenide.

7. An ink as recited in claim 5, wherein the graphene analogue includes a boron nitride.

8. An ink as recited in claim 1, wherein the precursor of the graphene analogue is a composition comprising a graphene oxide and a precursor of a transition metal dichalcogenide.

9. An ink as recited in claim 1, wherein a concentration of the precursor of the graphene analogue is about 1 wt % to about 60 wt % of total ink.

10. An ink as recited in claim 1, wherein the thickener is a thixotropic agent.

11. An ink as recited in claim 1, wherein the thickener is selected from the group consisting of: a surfactant, a cellulose derivative, and a carbon black material.

12. An ink as recited in claim 11, wherein the thickener includes the cellulose derivative, wherein a concentration of the cellulose derivative is in a range of about 1 wt % to about 5 wt % of total ink.

13. An ink as recited in claim 11, wherein the thickener includes the carbon black material, wherein a concentration of the carbon black material is in a range of about 5 wt % to about 20 wt % of total ink.

14. An ink as recited in claim 1, wherein the gelling agent includes an ammonium carbonate solution.

15. An ink, comprising:
a graphene analogue;
a thickener comprising a cellulose derivative; and
a solvent, wherein the ink is configured to be extruded through a nozzle for forming a three-dimensional structure via deposition of a plurality of layers of the ink in sequence.

16. An ink as recited in claim 15, wherein the graphene analogue is selected from the group consisting of: a transition metal dichalcogenide, boron nitride, and graphene.

17. An ink as recited in claim 11, wherein the ink includes a combination of thickeners.

18. An ink as recited in claim 1, wherein the ink is a co-gel suspension.

19. An ink as recited in claim 15, wherein the ink includes a combination of thickeners.

20. An ink as recited in claim 15, wherein the ink includes a co-gel suspension of graphene analogue@graphene oxide.

21. A method of forming an aerogel using the ink of claim 1, the method comprising:
obtaining the ink
forming a three-dimensional structure by direct ink writing using the ink;
drying the formed three-dimensional structure; and
thermal annealing the dried three-dimensional structure.

22. A method as recited in claim 21, the method further comprising:
before drying the formed three-dimensional structure, heating the three-dimensional structure for gelation of the three-dimensional structure; and
exchanging the solvent.

23. A method as recited in claim 21, wherein forming the ink includes extruding the ink through a nozzle for forming a ligament that is about equal to a diameter of the nozzle, wherein the ink is configured such that the ligament formed therefore has sufficient viscosity to enable formation of the three-dimensional structure via deposition of a plurality of layers of the ink in sequence.

24. An ink as recited in claim 1, wherein the thickener is a combination of a cellulose derivative and a carbon black material.

25. An ink as recited in claim 24, wherein the cellulose derivative and a the carbon black material are present in an effective amount to cause the ink to have sufficient viscosity to enable extrusion of the ink through a nozzle for forming a ligament about equal to the diameter of the nozzle.

26. An ink as recited in claim 15, wherein the ink is configured to be extruded through the nozzle for forming a ligament that is about equal to a diameter of the nozzle, wherein the ink is configured such that the ligament formed therefore has sufficient viscosity to enable formation of a three-dimensional structure via deposition of the plurality of layers of the ink in sequence.

27. An ink as recited in claim 15, wherein the thickener is present in an effective amount to cause the ink to have sufficient viscosity to enable extrusion of the ink through the nozzle for forming a ligament about equal to the diameter of the nozzle.

28. An ink as recited in claim 15, wherein the thickener includes a carbon black material.

29. An ink, comprising:
a precursor of a graphene analogue, wherein the precursor is a combination comprising a graphene oxide and a precursor of a second graphene analogue different than the graphene oxide, wherein the graphene oxide in the form of single layer sheets;
a thickener;
a gelling agent; and
a solvent.

* * * * *